(12) United States Patent
Choo et al.

(10) Patent No.: US 9,377,369 B2
(45) Date of Patent: Jun. 28, 2016

(54) TEMPERATURE AND PRESSURE MONITORING SYSTEM OF SEALED DERRICK STRUCTURE

(75) Inventors: Keum Dae Choo, Geoje Si (KR); D. Scott Brittin, Katy, TX (US)

(73) Assignees: Daewoo Shipbuilding & Marine Engineering Co., Ltd., Seoul (KR); Transocean Sedco Forex Ventures Limited, George Town (KY)

( * ) Notice: Subject to any disclaimer, the term of this patent is extended or adjusted under 35 U.S.C. 154(b) by 547 days.

(21) Appl. No.: 13/884,250

(22) PCT Filed: Jun. 22, 2011

(86) PCT No.: PCT/KR2011/004555
§ 371 (c)(1),
(2), (4) Date: Jul. 19, 2013

(87) PCT Pub. No.: WO2012/067329
PCT Pub. Date: May 24, 2012

(65) Prior Publication Data
US 2013/0301678 A1 Nov. 14, 2013

(30) Foreign Application Priority Data
Nov. 19, 2010 (KR) .................. 10-2010-0115604

(51) Int. Cl.
| G01K 13/00 | (2006.01) |
| G01K 1/00 | (2006.01) |
| G01K 3/00 | (2006.01) |
| G01K 13/02 | (2006.01) |
| E21B 15/00 | (2006.01) |

(Continued)

(52) U.S. Cl.
CPC . *G01K 13/02* (2013.01); *B63J 2/02* (2013.01); *E21B 15/00* (2013.01); *G01K 1/14* (2013.01); *B63B 35/44* (2013.01)

(58) Field of Classification Search
USPC .......................... 374/136, 143, 208, 110, 148
See application file for complete search history.

(56) References Cited

U.S. PATENT DOCUMENTS
2,153,350 A 4/1939 Stimac
2,691,272 A 10/1954 Townsend et al.
(Continued)

FOREIGN PATENT DOCUMENTS
GB 611961 A 11/1948
GB 1218530 A 1/1971
(Continued)

*Primary Examiner* — Mirellys Jagan
(74) *Attorney, Agent, or Firm* — Seed IP Law Group PLLC

(57) ABSTRACT

Provided is a system for monitoring temperature and pressure of an enclosed derrick structure communicating with a moonpool, which senses abnormal internal temperature and pressure of the enclosed derrick structure by monitoring the temperature and pressure of the enclosed derrick structure, thereby effectively coping with dangers. The system may include: one or more temperature sensors installed in the inside of the enclosed derrick to monitor an internal temperature of the enclosed derrick; one or more pressure sensors installed in the inside of the moonpool to monitor an internal pressure difference of the moonpool; and one or more damping units installed in a side of the enclosed derrick to supply air to the inside of the enclosed derrick or exhaust air to the outside of the enclosed derrick in order to cope with an abnormal internal temperature of the enclosed derrick and an abnormal internal pressure variation of the moonpool.

7 Claims, 1 Drawing Sheet

(51) Int. Cl.
*G01K 1/14* (2006.01)
*B63J 2/02* (2006.01)
*B63B 35/44* (2006.01)

(56) References Cited

U.S. PATENT DOCUMENTS

| | | |
|---|---|---|
| 2,804,951 A | 9/1957 | Kolt |
| 3,093,056 A | 6/1963 | Rosenfeld |
| 3,279,407 A | 10/1966 | Stenger |
| 3,461,828 A | 8/1969 | Bielstein |
| 3,593,645 A | 7/1971 | Day et al. |
| 3,626,836 A | 12/1971 | Schneidler |
| 3,850,125 A | 11/1974 | Anders |
| 4,053,732 A | 10/1977 | Carter |
| 4,407,185 A | 10/1983 | Haines et al. |
| 4,487,214 A | 12/1984 | Tatum |
| 4,613,001 A | 9/1986 | Edberg et al. |
| 4,627,767 A * | 12/1986 | Field ............... E02B 17/0021 114/264 |
| 4,666,341 A | 5/1987 | Field et al. |
| 4,991,532 A | 2/1991 | Locke |
| 5,927,222 A | 7/1999 | Eakin et al. |
| 7,413,007 B2 | 8/2008 | Yamaoka |
| 9,205,894 B2 | 12/2015 | Lee et al. |
| 2003/0196791 A1 | 10/2003 | Dunn et al. |
| 2005/0191136 A1 | 9/2005 | Xu |
| 2008/0009233 A1 | 1/2008 | Leseman et al. |
| 2008/0115998 A1 | 5/2008 | Naganuma et al. |
| 2010/0291857 A1 | 11/2010 | Cho et al. |
| 2013/0269584 A1 * | 10/2013 | Choo ............... B63B 35/4413 114/268 |
| 2013/0273823 A1 | 10/2013 | Choo et al. |
| 2013/0277062 A1 | 10/2013 | Choo et al. |
| 2013/0291780 A1 * | 11/2013 | Lee ............... B63H 21/34 114/268 |
| 2015/0184493 A1 * | 7/2015 | McDaniel ............ E21B 41/0021 169/69 |

FOREIGN PATENT DOCUMENTS

| | | |
|---|---|---|
| GB | 2 110 602 A | 6/1983 |
| JP | 60-62394 A | 4/1985 |
| JP | 60-126589 U | 8/1985 |
| JP | 63-6998 U | 1/1988 |
| JP | 2-100994 U | 8/1990 |
| JP | 3002545 B2 | 1/2000 |
| JP | 2000238695 A | 9/2000 |
| JP | 2005-306315 A | 11/2005 |
| KR | 20-0226940 Y1 | 6/2001 |
| KR | 10-2004-0020440 A | 3/2004 |
| KR | 20-0431766 Y1 | 11/2006 |
| KR | 10-2009-0053184 A | 5/2009 |
| KR | 10-2010-0028480 A | 3/2010 |
| WO | 97/42393 A1 | 11/1997 |

* cited by examiner

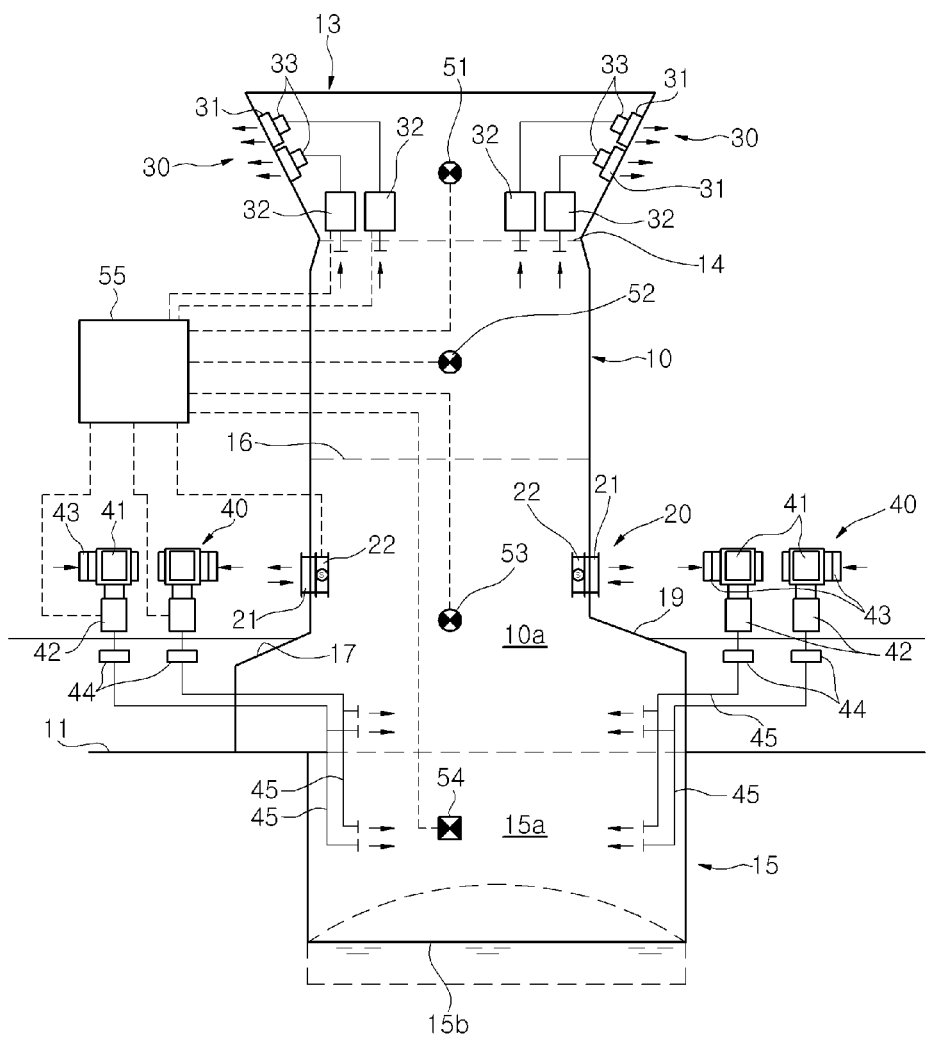

TEMPERATURE AND PRESSURE MONITORING SYSTEM OF SEALED DERRICK STRUCTURE

CROSS-REFERENCE(S) TO RELATED APPLICATION

This application is a national stage application filed under 35 U.S.C. §371 of International Application No. PCT/KR2011/004555, accorded an International Filing Date of Jun. 22, 2011, which claims priority of Korean Patent Application No. 10-2010-0115604, filed on Nov. 19, 2010, in the Korean Intellectual Property Office, which is hereby incorporated by reference in its entirety.

BACKGROUND

1. Technical Field

The present disclosure relates to an enclosed derrick structure, and more particularly, to a system for monitoring temperature and pressure of an enclosed derrick structure, which senses abnormal internal temperature and pressure of the enclosed derrick structure by monitoring the temperature and pressure of the enclosed derrick structure, thereby effectively coping with dangers.

2. Description of the Related Art

Due to the rapid international industrialization and industrial development, the use of the earth's resources, such as oil, is gradually increasing. Accordingly, stable production and supply of oil is emerging as a very important worldwide issue.

For this reason, much attention has recently been paid to development of small marginal fields or deep-sea oil fields, which have been ignored because of their low economic feasibility. Therefore, with the development of offshore drilling techniques, drill ships equipped with drilling equipment suitable for development of such oil fields have been developed.

In conventional offshore drilling, rig ships or fixed type platforms have been mainly used, which can be moved only by tugboats and are anchored at a position on the sea using a mooring gear to conduct an oil drilling operation. In recent years, however, so-called drill ships have been developed and used for offshore drilling. The drill ships are provided with advanced drilling equipment and have structures similar to typical ships such that they can make a voyage using their own power. Since drill ships have to frequently move in order for development of small marginal fields, they are constructed to make a voyage using their own power, without assistance of tugboats.

Meanwhile, a moonpool is formed at the center of a rig ship, a fixed type platform or a drill ship, such that a riser or a drill pipe is vertically movable through the moonpool. In addition, a derrick in which a variety of drilling equipment is integrated is installed on a deck.

BRIEF SUMMARY

An aspect of the present invention is directed to a system for monitoring temperature and pressure of an enclosed derrick structure, which senses abnormal internal temperature and pressure of the enclosed derrick structure by appropriately monitoring the internal temperature and pressure thereof according to ventilation and influence of waves within a moonpool, thereby improving the safety of equipment, workers, and working conditions inside the enclosed derrick structure.

Meanwhile, in order for drilling of natural resources in extremely cold regions such as arctic regions, arctic rig ships, fixed type arctic platforms, and arctic ships such as arctic drill ships have been built. Such arctic ships may be constructed to have an enclosed area in almost all zones in order to prevent freezing in extremely low temperature environments and ensure the smooth operation of equipment and crews' safety.

In particular, a derrick and a moonpool of an arctic ship are enclosed in order to protect internal equipment and workers. A ventilating system may be installed in the enclosed derrick and the enclosed moonpool in order for protection and ventilation of the inner spaces thereof. In particular, in order to meet a rule and regulation in an extremely low temperature region, it is preferable that the ventilating system supplies heated air to the derrick and the moonpool, and exhausts cooled air to the exterior through an upper portion of the derrick.

Meanwhile, there is a need for protecting equipment, workers, and working conditions inside the enclosed derrick and the enclosed moonpool by checking an abnormal operation state of a ventilating system and sensing abnormal internal temperature and pressure of the enclosed derrick and the enclosed moonpool.

According to an embodiment of the present invention, a system for monitoring temperature and pressure of an enclosed derrick structure communicating with a moonpool includes: one or more temperature sensors installed in the inside of the enclosed derrick to monitor an internal temperature of the enclosed derrick; one or more pressure sensors installed in the inside of the moonpool to monitor an internal pressure difference of the moonpool; and one or more damping units installed in a side of the enclosed derrick to supply air to the inside of the enclosed derrick or exhaust air to the outside of the enclosed derrick in order to cope with an abnormal internal temperature of the enclosed derrick and an abnormal internal pressure variation of the moonpool, wherein when the abnormal internal temperature of the enclosed derrick and the abnormal internal pressure of the moonpool are sensed by the monitoring of the temperature sensors and the pressure sensors, the damping units are selectively controlled according to the sensing results.

The system may further include: a supply unit supplying outside air to the inside of the moonpool; and an exhaust unit installed at an upper portion of the enclosed derrick to exhaust inside air.

The system may further include: a control unit coupled to the temperature sensors and the pressure sensors to control the operations of the supply unit, the exhaust unit, and the damping units, based on temperature and pressure information monitored by the temperature sensors and the pressure sensors.

The temperature sensors may include: a first temperature sensor installed at an upper portion of the enclosed derrick; a second temperature sensor installed at a middle portion of the enclosed derrick; and a third temperature sensor installed at a lower portion of the enclosed derrick.

According to another embodiment of the present invention, a system for monitoring temperature and pressure of an enclosed derrick structure communicating with a moonpool includes: one or more temperature sensors installed in the inside of the enclosed derrick to monitor an internal temperature of the enclosed derrick; and one or more pressure sensors installed in the inside of the moonpool to monitor an internal pressure difference of the moonpool, wherein the internal temperature of the enclosed derrick and the internal pressure of the moonpool are sensed.

The temperature sensors may include: a first temperature sensor installed at an upper portion of the enclosed derrick; a second temperature sensor installed at a middle portion of the enclosed derrick; and a third temperature sensor installed at a lower portion of the enclosed derrick.

The enclosed derrick may include an exhaust unit disposed on an upper inner side, and a fingerboard disposed across a middle inner portion. The first temperature sensor may be disposed adjacent to the exhaust unit of the enclosed derrick. The second temperature sensor may be disposed above the fingerboard of the enclosed derrick. The third temperature sensor may be disposed under the fingerboard of the enclosed derrick.

According to another embodiment of the present invention, a system for monitoring temperature and pressure of an enclosed derrick structure communicating with a moonpool is characterized in that an internal temperature of the enclosed derrick or an internal pressure of the moonpool is sensed, and the inside of the enclosed derrick is ventilated with the outside of the enclosed derrick according to a variation in the internal temperature of the enclosed derrick or the internal pressure of the moonpool.

BRIEF DESCRIPTION OF THE SEVERAL VIEWS OF THE DRAWINGS

FIG. 1 is a schematic view illustrating a system for monitoring temperature and pressure of an enclosed derrick structure according to an embodiment of the present invention.

DETAILED DESCRIPTION OF EXEMPLARY EMBODIMENTS

Exemplary embodiments of the present invention will be described below in detail with reference to the accompanying drawings.

FIG. 1 is a schematic view illustrating a system for monitoring temperature and pressure of an enclosed derrick structure according to an embodiment of the present invention.

As illustrated in FIG. 1, the system for monitoring the temperature and pressure of the enclosed derrick structure according to the embodiment of the present invention includes one or more temperature sensors 51, 52 and 53 and a pressure sensor 54, which are installed in the inside of the enclosed derrick structure. The enclosed derrick structure to which the present invention is to be applied includes an enclosed derrick 10 installed on a drill floor 11 of an arctic ship, and an enclosed moonpool 15 coupled to the bottom of the enclosed derrick 10.

The enclosed derrick 10 has a first inner space 10a, and the enclosed moonpool 15 has a second inner space 15a. The first inner space 10a and the second inner space 15a are coupled to communicate with each other. The enclosed derrick 10 is disposed on the drill floor 11 of the ship, and the enclosed moonpool 15 is disposed under the drill floor 11.

An outer wall of the enclosed derrick 10 is formed in an enclosed structure, and first and second enclosed tunnels 17 and 19 are provided on sides of the enclosed derrick 10. Openings are formed at the ends of the first and second enclosed tunnels 17 and 19, such that equipment such as a riser can be passed therethrough.

Supply units 40 are installed outside the enclosed derrick 10 to supply outside air from outside of the enclosed derrick 10 and the enclosed moonpool 15 to the first inner space 10a and the second inner space 15a. The supply unit 40 includes one or more inlet ports 41 installed at the outside of the drill floor 11, one or more supply fans 42 coupled to the inlet ports 41, one or more heaters 43 installed adjacent to the inlet ports 41, and one or more first open/close dampers 44 installed at a downstream side of the supply fan 42 to selectively allow the inflow of the outside air.

The supply fan 42 is coupled to a lower portion of the inlet port 41 and configured to forcibly blow the outside air to the second inner space 15a of the enclosed moonpool 15. The outside air forcibly blown by the supply fan 42 may be supplied through a supply pipe 45 to the second inner space 15a or the lower portion of the first inner space 10a.

When a temperature is low in an extremely cold region (below 0° C.), the heater 43 heats the outside air introduced through the inlet port 41. The heated air is supplied to the first and second inner spaces 10a and 15a by the supply fan 42. Accordingly, internal equipment, workers, and working conditions can be safely protected and maintained from external extreme environments.

The first open/close damper 44 may be selectively opened or closed to block an air flow in the event of a fire or other emergency or in the repair of the supply fan 42.

An exhaust unit 30 is installed at an upper portion of the enclosed derrick 10. When the outside air is supplied to the second inner space 15a of the enclosed moonpool 15 by the supply unit 40, the exhaust unit 30 guides the outside air to flow upwardly from the second inner space 15a of the enclosed moonpool 15 to the upper portion of the first inner space 10a of the enclosed derrick 10.

The exhaust unit 30 includes one or more exhaust ports 31 installed in an upper portion of the enclosed derrick 10, and one or more exhaust fans 32 coupled to the exhaust ports 31. The exhaust fan 32 is installed within a crown block section 13 and is coupled to a second open/close damper 33. The second open/close damper 33 may be selectively opened or closed to block air flow in the event of a fire or other emergency or in the repair of the exhaust fan 32.

In addition, an inlet/output port 15b is formed at a lower portion of the moonpool 15, and seawater waves may be transferred through the inlet/output port 15b. Due to the influence of waves on the moonpool 15, excessive negative pressure or positive pressure may be generated in the first and second inner spaces 10a and 15a. Therefore, one or more damper units 20 are installed on at least one side of the enclosed derrick 10. Since air is supplied to or discharged from the first inner space 10a by the damper units 20, it is possible to compensate or offset the excessive negative pressure or positive pressure generated in the first and second inner spaces 10a and 15a. Thus, the pressures of the first and second inner spaces 10a and 15a can be constantly maintained, thereby safely protecting internal equipment, workers, and working conditions.

The damper unit 20 includes one or more communication ducts 21 installed in the sides of the enclosed derrick 10 to communicate the outer space of the enclosed derrick 10 with the inner space of the enclosed derrick 10, and an open/close valve 22 coupled to the communication ducts 21 to selectively open or close the communication ducts 21.

The temperature sensors 51, 52 and 53 are installed in the first inner space 10a of the enclosed derrick 10 to monitor an internal temperature of the enclosed derrick 10, and the pressure sensor 54 is installed in the second inner space 15a of the moonpool 15 to monitor an internal pressure difference of the moonpool 15.

The temperature sensors 51, 52 and 53 include a first temperature sensor 51 installed at an upper portion of the first inner space 10a, a second temperature sensor 52 installed at a middle portion of the first inner space 10a, and a third temperature sensor 53 installed at a lower portion of the first inner space 10a.

The first temperature sensor 51 is installed adjacent to the exhaust unit 30 which is installed at an upper portion of the enclosed derrick 10. In particular, a top board 14 is disposed at an upper portion of the enclosed derrick 10, and the first temperature sensor 51 is installed on the top board 14.

The second temperature sensor 52 is installed on a fingerboard 16 of the enclosed derrick 10, and the third temperature sensor 53 is installed between the fingerboard 16 of the enclosed derrick 10 and the drill floor 11.

As such, since the first to third temperature sensors 51, 52 and 53 are installed in three partitioned regions of the first inner space 10a, respectively, the temperature of the first inner space 10a can be exactly measured or monitored.

The pressure sensor 54 is installed in the second inner space 15a to precisely measure or monitor a pressure difference generated in the second inner space 15a. In particular, the influence of waves on the moonpool 15 may generate excessive negative pressure or positive pressure in the second inner space 15a. In this case, the pressure sensor 54 can exactly measure or monitor a variation in the pressure of the second inner space 15a by precisely measuring or monitoring the negative pressure or the positive pressure.

According to the embodiments of the present invention, it is possible to exactly check the abnormal operations of the supply unit 40, the exhaust unit 30, and the damper unit 20 of the ventilating system through the first to third temperature sensors 51, 52 and 53 and the pressure sensor 54.

In addition, since the operation of the damper unit 20 is precisely controlled based on the temperature and pressure information monitored through the first to third temperature sensors 51, 52 and 53 and the pressure sensor 54, it is possible to effectively cope with dangers of abnormal temperature and abnormal pressure in the first and second inner spaces 10a and 15a. Therefore, it is possible to ensure the safety of workers, equipment and working conditions inside the enclosed derrick 10 and the moonpool 15.

In one embodiment, it is possible to cope with the abnormal temperatures of the first and second inner spaces 10a and 15a by precisely controlling the operation of the heater 43, the supply unit 40, the exhaust unit 30, or the damper unit 20 such that the internal temperatures of the first and second inner spaces 10a and 15a are maintained in the range from −20° C. to 45° C. according to the temperature values monitored by the first to third temperature sensors 51, 52 and 53. In most cases, the operation of the damper unit 20 is controlled. In addition, it is possible to cope with the abnormal pressures of the first and second inner spaces 10a and 15a by classifying the internal pressures of the first and second inner spaces 10a and 15a into a normal case and an abnormal case (arctic region, typhoon, etc.) according to environment conditions (waves and external temperature). In the normal case, it is preferable that the pressures of the first and second inner spaces are maintained at −25 Pa. In the abnormal case, it is preferable that the pressures of the first and second inner spaces are maintained in the range from −75 Pa to 25 Pa. At this time, a pressure maintaining unit controls the operation of the damper unit 20. The damper unit 20 may be controlled manually or automatically.

Moreover, a control unit 55 may be installed to connect to each piece of equipment in order to automatically control the supply fan 42, the heater 43, the first open/close damper 44, the supply unit 40, the exhaust unit 30, the damper unit 20, the temperature sensors 51, 52 and 53, or the pressure sensor 54.

According to the embodiments of the present invention, the internal temperature and pressure of the enclosed derrick structure can be appropriately monitored by the temperature sensors and the pressure sensor, thereby exactly checking the abnormal operation of the ventilating system.

Furthermore, since the damper unit 20 or the like is precisely controlled based on the temperature and pressure information monitored by the temperature sensors 51, 52 and 53 and the pressure sensor 54, it is possible to effectively cope with dangers of abnormal temperature and abnormal pressure in the enclosed derrick 10 and the enclosed moonpool 15. Therefore, it is possible to ensure the safety of workers, equipment and working conditions inside the enclosed derrick 10 and the enclosed moonpool 15.

While the embodiments of the present invention have been described with reference to the specific embodiments, it will be apparent to those skilled in the art that various changes and modifications may be made without departing from the spirit and scope of the invention as defined in the following claims. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A system for monitoring temperature and pressure of an enclosed derrick structure communicating with a moonpool, the system comprising:
    one or more temperature sensors installed within the enclosed derrick to monitor an internal temperature of the enclosed derrick;
    one or more pressure sensors installed within the moonpool to monitor an internal pressure difference of the moonpool;
    one or more damper units installed in a side of the enclosed derrick to supply air to the inside of the enclosed derrick or exhaust air to the outside of the enclosed derrick in order to cope with an abnormal internal temperature of the enclosed derrick and an abnormal internal pressure variation of the moonpool;
    a supply unit supplying outside air to the inside of the moonpool; and
    an exhaust unit exhausting inside air from the enclosed derrick,
    wherein when the abnormal internal temperature of the enclosed derrick and the abnormal internal pressure of the moonpool are sensed by the monitoring of the one or more temperature sensors and the one or more pressure sensors, the damper units are selectively controlled according to the sensing results.

2. The system according to claim 1, wherein the one or more temperature sensors comprise:
    a first temperature sensor installed at an upper portion of the enclosed derrick;
    a second temperature sensor installed at a middle portion of the enclosed derrick; and
    a third temperature sensor installed at a lower portion of the enclosed derrick.

3. The system according to claim 1, wherein the exhaust unit is installed at an upper portion of the enclosed derrick.

4. The system according to claim 3, further comprising:
    a control unit coupled to the one or more temperature sensors and the one or more pressure sensors to control the operations of the supply unit, the exhaust unit, and the damper units, based on temperature and pressure information monitored by the one or more temperature sensors and the one or more pressure sensors.

5. A system for monitoring temperature and pressure of an enclosed derrick structure communicating with a moonpool, the system comprising:
one or more temperature sensors installed in the inside of the enclosed derrick to monitor an internal temperature of the enclosed derrick; and
one or more pressure sensors installed in the inside of the moonpool to monitor an internal pressure difference of the moonpool,
wherein the internal temperature of the enclosed derrick and the internal pressure of the moonpool are sensed,
wherein the one or more temperature sensors comprise: a first temperature sensor installed at an upper portion of the enclosed derrick; a second temperature sensor installed at a middle portion of the enclosed derrick; and a third temperature sensor installed at a lower portion of the enclosed derrick,
wherein the enclosed derrick comprises an exhaust unit disposed on an upper inner side of the enclosed derrick and a fingerboard disposed across a middle inner portion of the enclosed derrick, and
wherein the first temperature sensor is disposed adjacent to the exhaust unit of the enclosed derrick, the second temperature sensor is disposed above the fingerboard of the enclosed derrick, and the third temperature sensor is disposed under the fingerboard of the enclosed derrick.

6. A system for monitoring at least one of temperature and pressure of an enclosed derrick structure communicating with a moonpool, characterized in that an internal temperature of the enclosed derrick or an internal pressure of the moonpool is sensed, and the inside of the enclosed derrick is ventilated with the outside of the enclosed derrick according to a variation in the internal temperature of the enclosed derrick or the internal pressure of the moonpool, and
wherein outside air is supplied to the inside of the moonpool with a supply unit and inside air is exhausted from the inside of the moonpool with an exhaust unit.

7. The system according to claim 6, wherein the exhaust unit is installed at an upper portion of the enclosed derrick structure.

* * * * *